(12) United States Patent
Chretien et al.

(10) Patent No.: US 12,258,843 B2
(45) Date of Patent: Mar. 25, 2025

(54) WELLSITE AUTOMATIC CONFIGURATION SYSTEMS AND METHODS OF OPERATION

(71) Applicant: Halliburton Energy Services, Inc., Houston, TX (US)

(72) Inventors: Alexander S. Chretien, Duncan, OK (US); Stanley V. Stephenson, Duncan, OK (US); Mark A. Adams, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 655 days.

(21) Appl. No.: 17/291,375

(22) PCT Filed: Dec. 20, 2018

(86) PCT No.: PCT/US2018/066947
§ 371 (c)(1),
(2) Date: May 5, 2021

(87) PCT Pub. No.: WO2020/131086
PCT Pub. Date: Jun. 25, 2020

(65) Prior Publication Data
US 2022/0003056 A1 Jan. 6, 2022

(51) Int. Cl.
*G06K 19/07* (2006.01)
*E21B 41/00* (2006.01)

(52) U.S. Cl.
CPC .......... *E21B 41/00* (2013.01); *G06K 19/0723* (2013.01)

(58) Field of Classification Search
None
See application file for complete search history.

(56) References Cited

U.S. PATENT DOCUMENTS

| | | | |
|---|---|---|---|
| 6,244,310 B1 | 6/2001 | Rowland et al. | |
| 7,523,639 B2 | 4/2009 | Hays | |
| 7,593,825 B2 | 9/2009 | Catelani et al. | |
| 9,181,793 B2 | 11/2015 | Baxter | |
| 9,383,287 B2 | 7/2016 | Rannow | |
| 9,454,510 B2 | 9/2016 | Braunstorfinger | |
| 9,909,908 B2 | 3/2018 | Mrvaljevic et al. | |
| 9,915,128 B2 | 3/2018 | Hunter | |
| 2007/0244428 A1 | 10/2007 | Uram et al. | |
| 2011/0272144 A1 | 11/2011 | Belcher | |
| 2013/0125612 A1 | 5/2013 | Hays et al. | |

(Continued)

OTHER PUBLICATIONS

International Search Report and Written Opinion mailed Sep. 11, 2019 for related PCT Application No. PCT/US2018/066947 filed Dec. 20, 2018.

*Primary Examiner* — Tuan S Nguyen
(74) *Attorney, Agent, or Firm* — K&L Gates LLP (57) ABSTRACT

The well system includes a first piece of wellsite equipment and a monitoring and control unit. The first piece of wellsite equipment includes an electronic storage device storing information related to the first piece of wellsite equipment. The monitoring and control unit is in electronic communication with the storage device of the first piece of wellsite equipment and configured to receive the stored information from the first piece of wellsite equipment, identify the first piece of wellsite equipment, and configure operational settings of the first piece of wellsite equipment.

17 Claims, 5 Drawing Sheets

(56) References Cited

U.S. PATENT DOCUMENTS

2016/0035048 A1* 2/2016 Chen .................. G06Q 50/06
 705/301
2016/0097270 A1 4/2016 Pobedinski et al.
2016/0290119 A1 10/2016 Tunc et al.
2017/0362928 A1* 12/2017 Kang .................. E21B 41/00

* cited by examiner

WELLSITE AUTOMATIC CONFIGURATION SYSTEMS AND METHODS OF OPERATION

BACKGROUND

This section is intended to provide relevant background information to facilitate a better understanding of the various aspects of the described embodiments. Accordingly, it should be understood that these statements are to be read in this light and not as admissions of prior art.

Hydrocarbons, such as oil and gas, are commonly obtained from subterranean formations that may be located onshore or offshore. Subterranean operations and the processes involved in removing hydrocarbons from a subterranean formation are complex. Typically, subterranean operations involve a number of different steps such as, for example, drilling a borehole at a desired well site, treating the borehole to optimize production of hydrocarbons, and performing the necessary steps to produce and process the hydrocarbons from the subterranean formation.

Various pieces of wellsite equipment located at the wellsite, such as pumping systems, mixers, blenders, and storage tanks, are used in all phases of well servicing operations. For example, pumping systems may be used to pump water, cement, fracturing fluids, and other stimulation or servicing fluids from a storage tank and through a mixer or blender before injecting the fluid downhole. However, the pieces of wellsite equipment need to be configured prior to start-up and one or more pieces of wellsite equipment may need to be replaced, requiring additional configuration of the system. Currently, the operator must manually adjust the control system to configure the pieces of wellsite equipment. However, the operator typically does not have a clear indication of the operational parameters of the pieces of wellsite equipment. Further, the optimal configurations of the pieces of wellsite equipment and the existing pieces of wellsite equipment may change once all the pieces of wellsite equipment have been interconnected to perform the well servicing operations.

Accordingly, there exists a need for an improved system and method for configuring wellsite equipment.

BRIEF DESCRIPTION OF THE DRAWINGS

Embodiments of the wellsite automatic configuration system are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure provides an automatic configuration system for a wellsite. The automatic configuration system allows for the quick identification of a new piece of wellsite equipment such that an operator can control the piece of wellsite equipment according to predetermined operational parameters.

Figure 1:
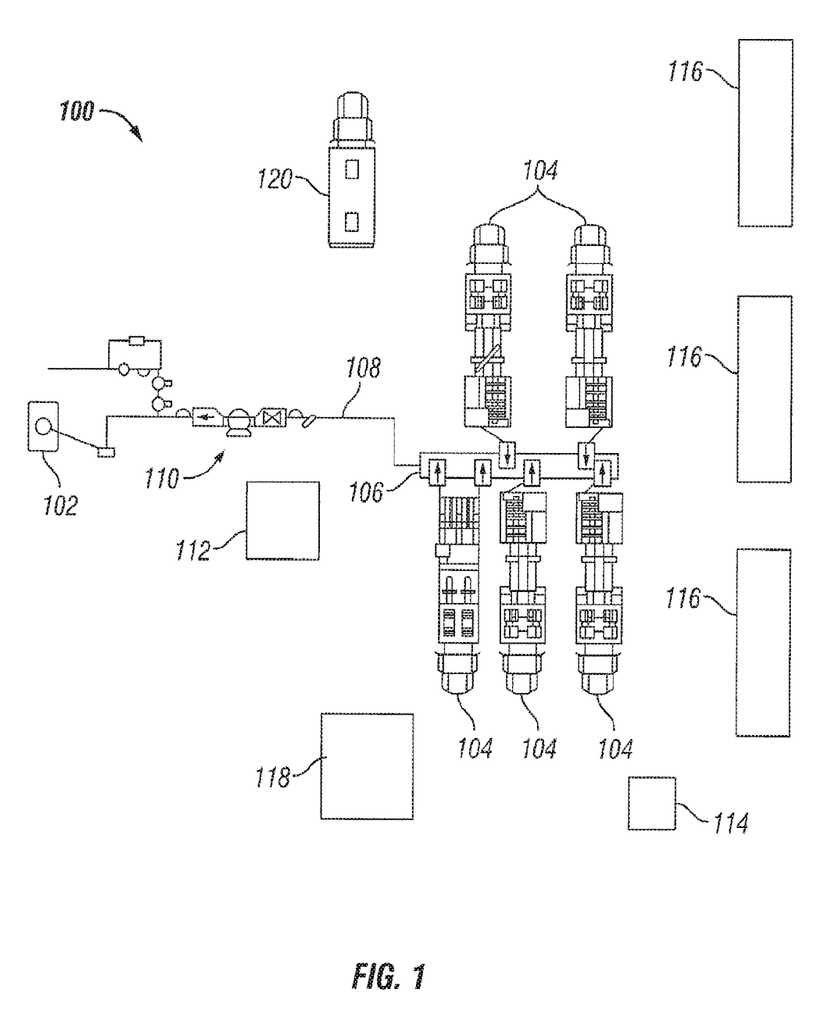
FIG. 1 is a schematic diagram of a wellsite, according to one or more embodiments.

FIG. 1 is a schematic diagram of a wellsite 100, according to one or more embodiments. The wellhead 102 is located over a borehole and connected to one or more pieces of wellsite equipment, such as pumping systems (five shown, 104). The pumping systems 104 are connected to a manifold 106 and piping 108 that includes equipment, such as valves 110, for monitoring and/or controlling the flow of fluid into the borehole through the wellhead 102. The wellsite also includes pieces of wellsite equipment such a generator 112, a blender 114, storage tanks (three shown, 116), a fluid distribution system 118, and a monitoring and control unit 120. The storage tanks 116 may contain fuel, borehole fluids, proppants, diesel exhaust fluid, and other materials.

The fluid distribution system 118 is fluidly coupled to one or more pieces of wellsite equipment, such as the pump trucks 104, the generator 112, and/or the blender 114. The fluid distribution system 118 receives fluids from the storage tanks 116 and supplies the fluids, such as fuel, diesel exhaust fluid, fracturing fluid, or other chemicals, to the pieces of wellsite equipment 104, 112, 114 as necessary. As shown in FIG. 1, much of the wellsite equipment is mounted on trucks. However, the wellsite equipment may also be free standing, mounted on a skid, or mounted on a trailer. Additionally, wellsite equipment that is shown as free standing may be mounted on a truck, a skid, or a trailer.

The monitoring and control unit 120 is electronically connected to one or more of the other pieces of wellsite equipment 104, 110, 112, 114, 116, 118, and is used to control the connected pieces of wellsite equipment 104, 110, 112, 114, 116, 118. In some embodiments, the monitoring and control unit 120 may be connected to the pieces of wellsite equipment 104, 110, 112, 114, 116, 118 through a wired connection. In other embodiments, the monitoring and control unit 120 may be connected to the pieces of wellsite equipment 104, 110, 112, 114, 116, 118 through a wireless connection, such as, but not limited to, WiFi, Bluetooth, RFID, and/or ZigBee, or through a combination of wired connections and wireless connections.

Each piece of wellsite equipment 104, 110, 112, 114, 116, 118 connected to the monitoring and control unit 120 may also include an electronic storage device, such as local electronic memory, an RFID tag, a QR code, or a bar code. The electronic storage device stores information that can be read by the monitoring and control unit 120 to identify the piece of wellsite equipment 104, 110, 112, 114, 116, 118.

In some embodiments, the information stored on the electronic storage device also includes operational parameters for the respective piece of wellsite equipment 104, 110, 112, 114, 116, 118. In other embodiments, the monitoring and control unit 120 also stores a look-up table of operational parameters for different types of wellsite equipment 104, 110, 112, 114, 116, 118. The monitoring and control unit 120 uses the information from a piece of wellsite equipment 104, 110, 112, 114, 116, 118 to determine the correct entry in the look-up table for the piece of wellsite equipment 104, 110, 112, 114, 116, 118. In other embodiments, a piece of wellsite equipment 104, 110, 112, 114, 116, 118 includes an identifier component, such as a resistor with a specific value, that is detected by the monitoring and control unit 120 and used to determine the correct entry from the look-up table for the piece of wellsite equipment 104, 110, 112, 114, 116, 118.

The operational parameters for the pieces of wellsite equipment 104, 112, 114, 116, 118 vary depending on the type of wellsite equipment 104, 112, 114, 116, 118. As a non-limiting example, the operational parameters of the pumping system 104 include a fluid flow rate that the pump is capable of and the operational parameters of the generator 112 may include an optimal rotational speed for power generation. Additionally, the operational parameters of storage tanks 116 include the type of fluid that is contained within the storage tank 116.

Additionally, the latency of the connection between the pieces of wellsite equipment 104, 112, 114, 116, 118 and the monitoring and control unit 120 can be used to determine the location of each piece of wellsite equipment 104, 112, 114, 116, 118 on the wellsite 100. In addition to or in place of monitoring the latency of the connections to determine position, the monitoring and control unit 120 may use optical sensors positioned around the wellsite 100 to locate the pieces of wellsite equipment 104, 112, 114, 116, 118 via visual recognition utilizing artificial intelligence or the pieces of wellsite equipment 104, 112, 114, 116, 118 may include GPS tracking equipment. Additionally, RFID tags may be read by multiple RFID readers (not shown) connected to the monitoring and control unit 120 to triangulate the position of the piece of wellsite equipment 104, 112, 114, 116, 118 on the wellsite 100.

The operational parameters are used by the monitoring and control unit 120 to configure the connected pieces of wellsite equipment 104, 112, 114, 116, 118 for operation. For example, the monitoring and control unit 120 adjusts the operational parameters of one or more pieces of wellsite equipment 104, 112, 114, 116, 118 based on an incompatibility between two or more pieces of wellsite equipment 104, 112, 114, 116, 118. Specifically, the monitoring and control unit 120 may reduce a flowrate of the pumping system 104 to match a maximum flowrate a valve 110 is capable of receiving. The monitoring and control unit 120 may also alert an operator to incompatibilities between the pieces of wellsite equipment 104, 112, 114, 116, 118. In some embodiments, the monitoring and control unit 120 adjusts the operational parameters of one or more pieces of wellsite equipment 104, 112, 114, 116, 118 based on other pieces of wellsite equipment 104, 112, 114, 116, 118 that are connected to the monitoring and control unit 120 to optimize the performance of the system as a whole. However, optimizing the performance system as a whole may cause one or more pieces of wellsite equipment 104, 112, 114, 116, 118 to operate outside of their optimal state based on the respective operational parameters. The use of the monitoring and control unit 120 to configure the pieces of wellsite equipment 104, 112, 114, 116, 118 reduces the non-performance time that is required for wellsite operations. The monitoring and control unit 120 also ensures that the pieces of wellsite equipment 104, 112, 114, 116, 118 are properly configured, reducing costs associated with poor quality.

Figure 2:
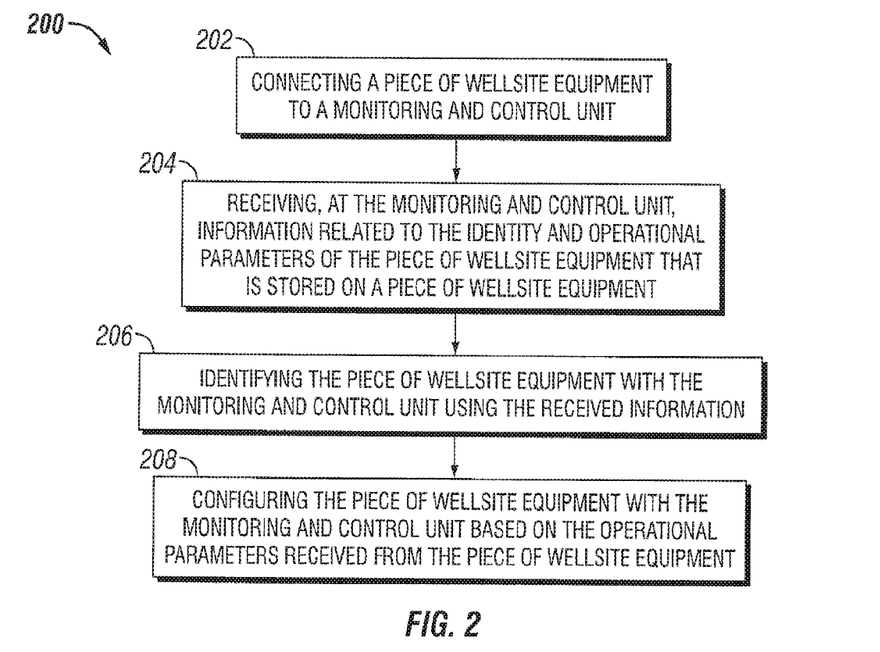
FIG. 2 is a flow chart illustrating a method of configuring a well system that includes the monitoring and control unit and at least one piece of wellsite equipment, according to one or more embodiments disclosed.

FIG. 2 is a flow chart 200 illustrating a method of configuring a well system that includes the monitoring and control unit 120 and at least one piece of wellsite equipment 104, 112, 114, 116, 118. At least one piece of wellsite equipment 104, 112, 114, 116, 118 is connected to the monitoring and control unit 120, as shown at 202. As previously discussed, this can be a wired connection or a wireless connection. Prior to start-up of the piece of wellsite equipment 104, 112, 114, 116, 118, the monitoring and control unit 120 receives information related to the identity and operational parameters of the piece of wellsite equipment 104, 112, 114, 116, 118 that is stored on the piece of wellsite equipment 104, 112, 114, 116, 118, as shown at 204. The received information from the piece of wellsite equipment 104, 112, 114, 116, 118 is used by the monitoring and control unit 120 to identify the piece of wellsite equipment 104, 112, 114, 116, 118, as shown at 206. The control system then configures the piece of wellsite equipment 104, 112, 114, 116, 118 based on the operational parameters received from the piece of wellsite equipment 104, 112, 114, 116, 118, as shown at 208.

Figure 3:
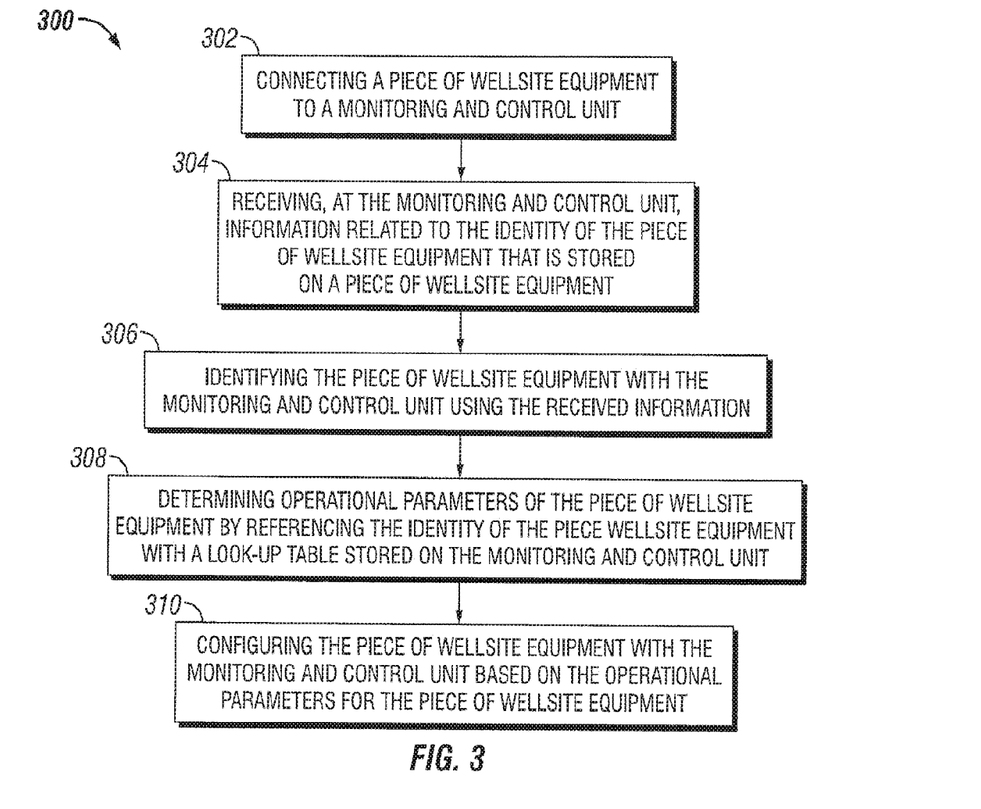
FIG. 3 is a flow chart illustrating a method of configuring a well system that includes the monitoring and control unit and at least one piece of wellsite equipment, according to one or more embodiments disclosed.

FIG. 3 is a flow chart 300 illustrating a method of configuring a well system that includes the monitoring and control unit 120 and at least one piece of wellsite equipment 104, 112, 114, 116, 118. At least one piece of wellsite equipment 104, 112, 114, 116, 118 is connected to the monitoring and control unit 120, as shown at 302. As previously discussed, this can be a wired connection or a wireless connection. Prior to start-up of the piece of wellsite equipment 104, 112, 114, 116, 118, the monitoring and control unit 120 receives information related to the identity of the piece of wellsite equipment 104, 112, 114, 116, 118 that is stored on the piece of wellsite equipment 104, 112, 114, 116, 118, as shown at 304. The received information from the piece of wellsite equipment 104, 112, 114, 116, 118 is used by the monitoring and control unit 120 to identify the piece of wellsite equipment, as shown at 306. The monitoring and control unit then determines the operational parameters for the piece of wellsite equipment 104, 112, 114, 116, 118 by referencing the identity of the piece of wellsite equipment 104, 112, 114, 116, 118 with a look-up table stored on the monitoring and control unit 120, as shown at 308. The control system then configures the piece of wellsite equipment 104, 112, 114, 116, 118 based on the operational parameters for the piece of wellsite equipment 104, 112, 114, 116, 118, as shown at 310.

After configuring the piece of wellsite equipment 104, 112, 114, 116, 118 as described, the control system operates the piece of wellsite equipment 104, 112, 114, 116, 118 in accordance with the operational parameters to perform an operation at the wellsite 100. The monitoring and control unit 120, the piece of wellsite equipment 104, 112, 114, 116, 118, or both may store the last used configuration of the piece of wellsite equipment 104, 112, 114, 116, 118 and store the last known calibration information for the applicable pieces of wellsite equipment 104, 112, 114, 116, 118. Although the previous examples featured only one piece of wellsite equipment 104, 112, 114, 116, 118, the monitoring and control unit 120 goes through a similar process for each additional piece of wellsite equipment 104, 112, 114, 116, 118.

The monitoring and control unit 120 may also determine the type of operation to be performed at the wellsite 100 based on the pieces of wellsite equipment 104, 112, 114, 116, 118 that are connected to the monitoring and control unit 120. Once the type of operation is identified, the monitoring and control unit 120 may adjust the operational parameters of one or more pieces of wellsite equipment 104, 112, 114, 116, 118 as necessary to perform the operation. As a non-limiting example, the monitoring and control unit 120 identifies the fluid within the storage tanks 116 and the type of blender 114 connected to the monitoring and control unit 120, and determine that a particular fluid mix will be injection into a borehole (not shown) through the wellhead 102 based on the storage tanks 116 and blender 114. The monitoring and control unit 120 may then adjust the operational parameters of the pieces of wellsite equipment 104, 112, 114, 116, 118 to ensure the correct fluid mix is produced and that the fluid mix pumped downhole at the correct flowrate and/or pressure. Once the pieces of wellsite equipment 104, 112, 114, 116, 118 are configured by the monitoring and control unit 120, the injection operation is conducted at the wellsite 100. Additional operations that can be detected by the monitoring and control unit 120 based on the pieces of wellsite equipment 104, 112, 114, 116, 118 include, but are not limited to, fracturing operations and cementing operations.

Figure 4:
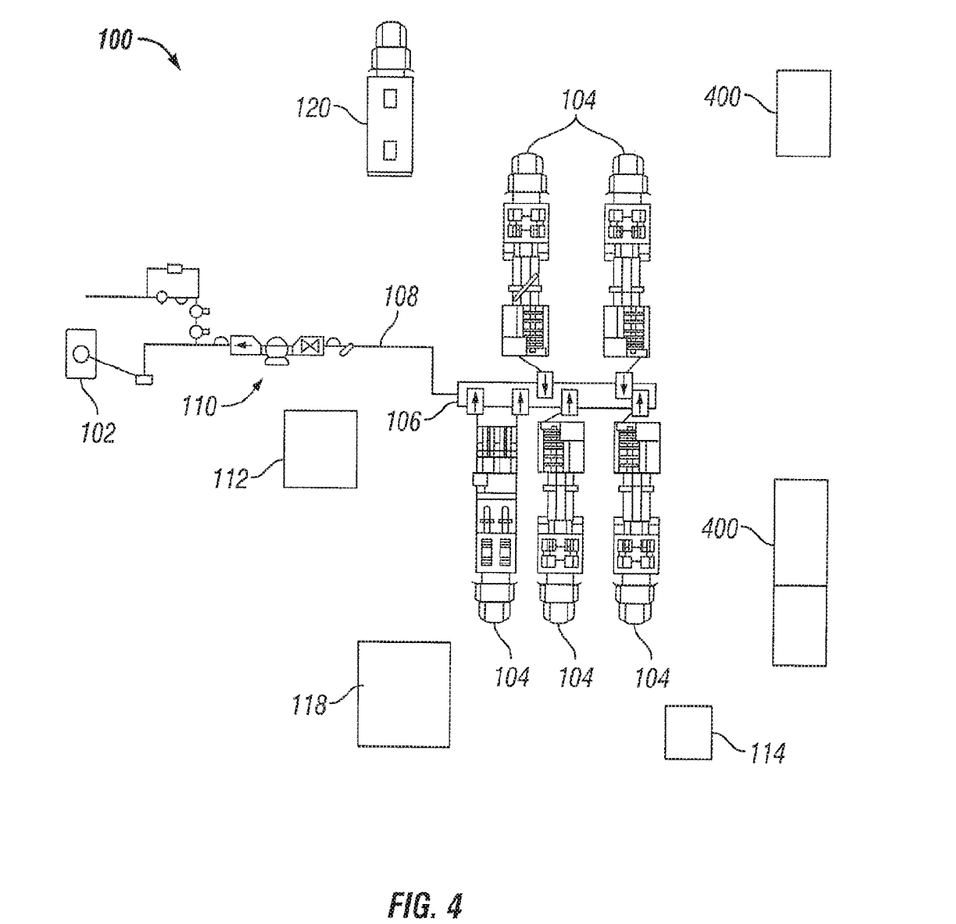
FIG. 4 is a schematic diagram of the wellsite of FIG. 1, with multiple pieces of wellsite equipment replaced.

FIG. 4 is a schematic diagram of the wellsite 100 of FIG. 1, with multiple pieces of wellsite equipment 104, 112, 114, 400, 118 replaced. Specifically, the storage tanks 116 have been replaced by new storage tanks 400. Prior to or at start-up of the pieces of wellsite equipment 104, 112, 114, 400, 118, the monitoring and control unit 120 detects that the original storage tanks 116 have been removed and the new storage tanks 400 have been connected to the monitoring and control unit 120. This is done by storing the identities of the last used pieces of wellsite equipment 104, 112, 114, 116, 118 on the monitoring and control unit 120 and comparing the last used pieces of wellsite equipment 104, 112, 114, 116, 118 to the current pieces of wellsite equipment 104, 112, 114, 400, 118 connected to the monitoring and control unit 120. If any new pieces of wellsite equipment 400 have been connected to the monitoring and control unit 120, they are identified as described above.

Although FIG. 4 shows the replacement of the storage tanks 116 with new storage tanks 400, the monitoring and control unit 120 would go through a similar process if any other pieces of wellsite equipment 104, 112, 114, 118 were removed or replace. The monitoring and control system 120 may then adjust the operational parameters of one or more pieces of wellsite equipment 104, 112, 114, 400, 118 based on the identity and/or operational parameters of the new piece of wellsite equipment 400 and/or the removal of a piece of wellsite equipment 104, 112, 114, 116, 118.

Figure 5:
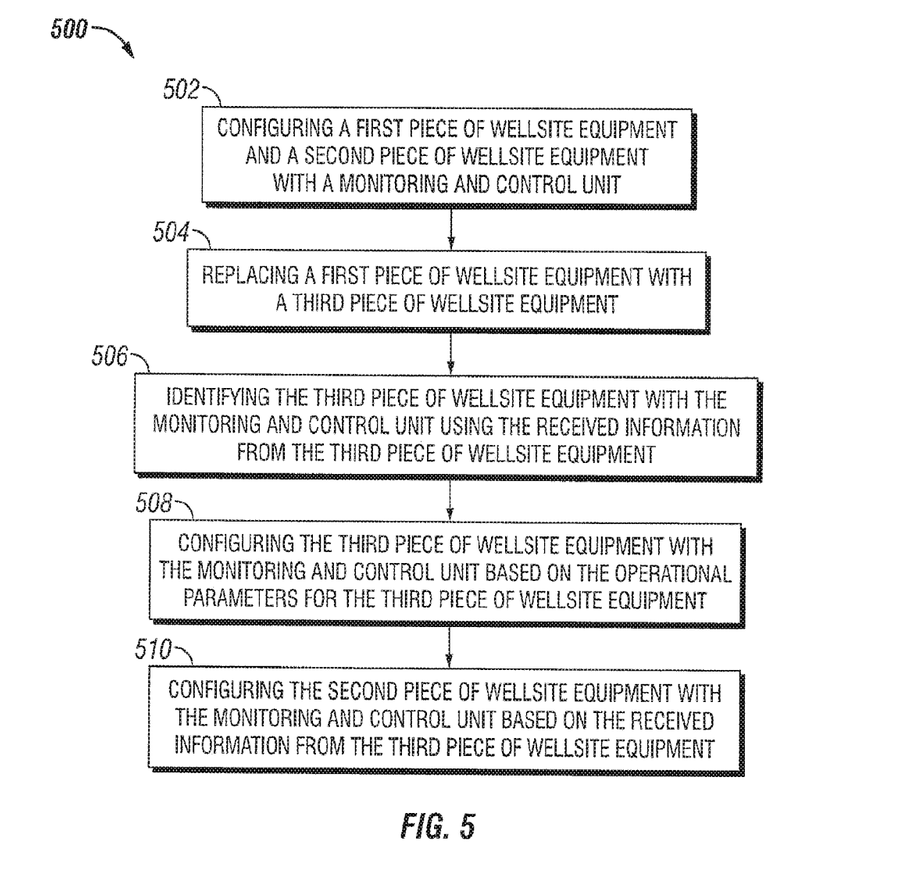
FIG. 5 is a flow chart illustrating a method of configuring a well system including a monitoring and control unit and multiple pieces of wellsite equipment, according to one or more embodiments disclosed.

FIG. 5 is a flow chart 500 illustrating a method of configuring a well system including a monitoring and control unit and multiple pieces of wellsite equipment. A first piece of wellsite equipment 104, 112, 114, 116, 118, 400, and a second piece of wellsite equipment 104, 112, 114, 116, 118, 400 are configured with a monitoring and control unit 120, as shown at 502. The first piece of wellsite equipment 104, 112, 114, 116, 118, 400 is then replaced with a third piece of wellsite equipment 104, 112, 114, 116, 118, 400, as shown at 504. The third piece of wellsite equipment 104, 112, 114, 116, 118, 400 is identified by the monitoring and control unit using received information from the third piece of wellsite equipment 104, 112, 114, 116, 118, 400, as shown at 506. The monitoring and control unit 120 configures the third piece of wellsite equipment 104, 112, 114, 116, 118, 400 based on the operational parameters of the third piece of wellsite equipment, as shown at 508. The monitoring and control unit 120 then configures the second piece of wellsite equipment 104, 112, 114, 116, 118, 400 based on the received information from the third piece of wellsite equipment 104, 112, 114, 116, 118, 400, as shown at 510.

Certain embodiments of the disclosed invention include a well system. The well system includes a first piece of wellsite equipment and a monitoring and control unit. The first piece of wellsite equipment includes an electronic storage device storing information related to the first piece of wellsite equipment. The monitoring and control unit is in electronic communication with the storage device of the first piece of wellsite equipment and configured to receive the stored information from the first piece of wellsite equipment, identify the first piece of wellsite equipment, and configure operational settings of the first piece of wellsite equipment.

In certain embodiments of the well system, the information stored on the electronic storage device includes the operational parameters of the first piece of well site equipment.

In certain embodiments of the well system, the well system also includes a second piece of wellsite equipment comprising second electronic storage device storing information related to the second piece of wellsite equipment. The monitoring and control unit is in electronic communication with the second piece of wellsite equipment and is further configured to receive the information from the second piece of wellsite equipment, identify the second piece of wellsite equipment, and configure operational settings of the second piece of wellsite equipment.

In certain embodiments of the well system, the monitoring and control unit is further configured to adjust the operational settings of the first piece of wellsite equipment based on the stored information from the second piece of wellsite equipment.

In certain embodiments of the well system, the monitoring and control unit is further configured to determine the locations of the first piece of wellsite equipment and the second piece of wellsite equipment relative to each other.

In certain embodiments of the well system, the monitoring and control unit is further configured to determine the type of operation to be performed by the well system based on the stored information from the first piece of wellsite equipment.

In certain embodiments of the well system, the electronic storage device comprises an RFID tag and the monitoring and control unit is further configured to read the RFID tag to identify the first piece of wellsite equipment.

In certain embodiments of the well system, the stored information corresponds to an entry in a look-up table stored on the monitoring and control unit, where the entry also comprises the operational parameters of the first piece of wellsite equipment.

Certain embodiments of the disclosed invention include a method for configuring a well system. The method includes connecting a first piece of wellsite equipment to a monitoring and control unit. The method further includes receiving, at the monitoring and control unit, information that is stored on the first piece of wellsite equipment. The method also includes identifying the first piece of wellsite equipment based on the stored information received from the first piece of wellsite equipment. The method further includes configuring the first piece of wellsite equipment with the monitoring and control unit based on operational parameters of the first piece of wellsite equipment.

In certain embodiments of the method, the method also includes performing an operation at the wellsite with the well system.

In certain embodiments of the method, the information stored on the first piece of wellsite equipment includes the operational parameters.

In certain embodiments of the method, the method also includes determining operational parameters for the first piece of wellsite equipment by referencing a look-up table.

In certain embodiments of the method, the method also includes determining the type of operation to be performed by the well system based on the information received from the first piece of wellsite equipment.

In certain embodiments of the method, receiving, at the monitoring and control unit, information that is stored on the first piece of wellsite equipment includes transmitting the stored information from the first piece of wellsite equipment to the monitoring and control unit.

In certain embodiments of the method, the method also includes storing the information on an RFID tag located on the first piece of wellsite equipment. Receiving, at the monitoring and control unit, information that is stored on the first piece of wellsite equipment includes receiving the stored information from the first piece of wellsite equipment comprises detecting the RFID tag.

In certain embodiments of the method, the method also includes connecting a second piece of wellsite equipment to the monitoring and control unit. The method further includes receiving, at the monitoring and control unit, information that is stored on the second piece of wellsite equipment. The method also includes identifying the second piece of wellsite equipment based on the stored information received from the second piece of wellsite equipment. The method further includes configuring the second piece of wellsite equipment with the monitoring and control unit based on the operational parameters of the second piece of wellsite equipment.

In certain embodiments of the method, the method also includes adjusting the configuration of the first piece of wellsite equipment based on the information received from the second piece of wellsite equipment.

In certain embodiments of the method, the method also includes determining the location of the second piece of wellsite equipment relative to the first piece of wellsite equipment.

In certain embodiments of the method, the method also includes replacing at least one of the first piece of wellsite equipment or the second piece of wellsite equipment with a third piece of wellsite equipment.

In certain embodiments of the method, replacing at least one of the first piece of wellsite equipment or the second piece of wellsite equipment with a third piece of wellsite equipment includes disconnecting the first piece of wellsite equipment or the second piece of wellsite equipment from the monitoring and control unit. Replacing at least one of the first piece of wellsite equipment or the second piece of wellsite equipment with a third piece of wellsite equipment also includes connecting a third piece of wellsite equipment to the monitoring and control unit. Replacing at least one of the first piece of wellsite equipment or the second piece of wellsite equipment with a third piece of wellsite equipment further includes receiving, at the monitoring and control unit, information stored on the third piece of wellsite equipment. Replacing at least one of the first piece of wellsite equipment or the second piece of wellsite equipment with a third piece of wellsite equipment also includes configuring the third piece of wellsite equipment with the monitoring and control unit based on the operational parameters of the third piece of wellsite equipment.

One or more specific embodiments of the wellsite configuration system have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A well system comprising:
   a first piece of wellsite equipment comprising an electronic storage device storing information related to the first piece of wellsite equipment; and
   a monitoring and control unit comprising a look-up table of operational parameters used to configure the first piece of wellsite equipment for operation, the operational parameters corresponding to the stored information,
   wherein the monitoring and control unit is configured to automatically establish electronic communication with the first piece of wellsite equipment, automatically read, through the electronic communication, the stored information from the first piece of wellsite equipment, automatically identify the first piece of wellsite equipment, automatically determine operational parameters for the first piece of wellsite equipment by referencing the identity of the first piece of wellsite equipment with the look-up table, and automatically configure, in the monitoring and control unit, the first piece of wellsite equipment for operation based on the operational parameters of the first piece of wellsite equipment in the look-up table.

2. The well system of claim 1, wherein the information stored on the electronic storage device includes the operational parameters of the first piece of wellsite equipment.

3. The well system of claim 1, further comprising a second piece of wellsite equipment comprising second electronic storage device storing information related to the second piece of wellsite equipment, wherein the stored information corresponds to an entry of operational parameters used to configure the second piece of wellsite equipment for operation in the look-up table, wherein the monitoring and control unit is in electronic communication with the second piece of wellsite equipment and is further configured to automatically read, through the electronic communication, the information from the second piece of wellsite equipment, automatically identify the second piece of wellsite equipment, automatically determine operational parameters for the second piece of wellsite equipment by referencing the identity of the second piece of wellsite equipment with the look-up table, and automatically configure, in the monitoring and control unit, the second piece of wellsite equipment for operation based on the operational parameters in the look-up table.

4. The well system of claim 3, wherein the monitoring and control unit is further configured to automatically adjust the operational parameters of the first piece of wellsite equipment based on the stored information from the second piece of wellsite equipment.

5. The well system of claim 3, wherein the monitoring and control unit is further configured to automatically determine the locations of the first piece of wellsite equipment and the second piece of wellsite equipment relative to each other.

6. The well system of claim 1, wherein the monitoring and control unit is further configured to automatically determine the type of operation to be performed by the well system based on the stored information from the first piece of wellsite equipment.

7. The well system of claim 1, wherein the electronic storage device comprises an RFID tag and the monitoring and control unit is further configured to automatically read the RFID tag to automatically identify the first piece of wellsite equipment.

8. A method for automatically configuring a well system, the method comprising:
automatically connecting a first piece of wellsite equipment in electronic communication with a monitoring and control unit comprising a look-up table of operational parameters used to configure the first piece of wellsite equipment for operation;
automatically reading, at the monitoring and control unit through the electronic communication, information that is stored on the first piece of wellsite equipment, wherein the stored information corresponds to an entry in the look-up table;
automatically identifying the first piece of wellsite equipment based on the stored information read from the first piece of wellsite equipment;
automatically determining operational parameters for the first piece of wellsite equipment by referencing the identity of the first piece of wellsite equipment with the look-up table; and
automatically configuring, in the monitoring and control unit, the first piece of wellsite equipment for operation based on the operational parameters of the first piece of wellsite equipment in the look-up table.

9. The method of claim 8, further comprising operating the first piece of wellsite equipment in accordance with the operational parameters to perform an operation at the wellsite with the well system.

10. The method of claim 8, further comprising determining the type of operation to be performed by the well system based on the information received from the first piece of wellsite equipment.

11. The method of claim 8, wherein automatically reading, at the monitoring and control unit, information that is stored on the first piece of wellsite equipment comprises electronically transmitting the stored information from the first piece of wellsite equipment to the monitoring and control unit.

12. The method of claim 8, further comprising storing the information on an RFID tag located on the first piece of wellsite equipment wherein automatically reading, at the monitoring and control unit, information that is stored on the first piece of wellsite equipment comprises automatically reading the stored information from the first piece of wellsite equipment from the RFID tag.

13. The method of claim 8, further comprising:
automatically connecting a second piece of wellsite equipment to the monitoring and control unit in electronic communication;
automatically reading, at the monitoring and control unit through the electronic communication, information that is stored on the second piece of wellsite equipment, wherein the stored information corresponds to an entry of operational parameters used to configure the second piece of wellsite equipment for operation in the look-up table;
automatically identifying the second piece of wellsite equipment based on the stored information read from the second piece of wellsite equipment;
automatically determining operational parameters for the second piece of wellsite equipment by referencing the identity of the second piece of wellsite equipment with the look-up table; and
automatically configuring the second piece of wellsite equipment for operation, in the monitoring and control unit, based on the operational parameters of the second piece of wellsite equipment in the look-up table.

14. The method of claim 13, further comprising automatically adjusting the configuration of the first piece of wellsite equipment based on the information received from the second piece of wellsite equipment.

15. The method of claim 13, further comprising determining the location of the second piece of wellsite equipment relative to the first piece of wellsite equipment.

16. The method of claim 8, further comprising replacing at least one of the first piece of wellsite equipment or the second piece of wellsite equipment with a third piece of wellsite equipment.

17. The method of claim 16, wherein replacing at least one of the first piece of wellsite equipment or the second piece of wellsite equipment with a third piece of wellsite equipment comprises:
disconnecting the first piece of wellsite equipment or the second piece of wellsite equipment from the monitoring and control unit;
automatically connecting a third piece of wellsite equipment in electronic communication with the monitoring and control unit;
automatically reading, at the monitoring and control unit through the electronic communication, information stored on the third piece of wellsite equipment, wherein the stored information corresponds to an entry in the look-up table;
automatically determining operational parameters for the third piece of wellsite equipment by referencing the identity of the third piece of wellsite equipment with the look-up table; and
automatically configuring, in the monitoring and control unit, the third piece of wellsite equipment for operation based on the operational parameters of the third piece of wellsite equipment in the look-up table.

* * * * *